G. C. & H. K. WOLFE.
WEEDER AND CULTIVATOR.
APPLICATION FILED JUNE 22, 1910.

981,512.

Patented Jan. 10, 1911.
2 SHEETS—SHEET 1.

Grover C. Wolfe and
Henry K. Wolfe.
Inventors,

Witnesses
J B Brantly
L. Helen Fowler

Per
Mason Fenwick Lawrence
Attorneys,

G. C. & H. K. WOLFE.
WEEDER AND CULTIVATOR.
APPLICATION FILED JUNE 22, 1910.

981,512.

Patented Jan. 10, 1911.
2 SHEETS—SHEET 2.

Grover C. Wolfe and
Henry K. Wolfe,
Inventors,

Witnesses
J. D. Brantly
L. Helen Fowler per Mason Fenwick Lawrence
Attorneys

UNITED STATES PATENT OFFICE.

GROVER C. WOLFE AND HENRY K. WOLFE, OF CHENEY, WASHINGTON.

WEEDER AND CULTIVATOR.

981,512. Specification of Letters Patent. Patented Jan. 10, 1911.

Application filed June 22, 1910. Serial No. 568,331.

*To all whom it may concern:*

Be it known that we, GROVER C. WOLFE and HENRY K. WOLFE, citizens of the United States, residing at Cheney, in the county of Spokane and State of Washington, have invented certain new and useful Improvements in Weeders and Cultivators; and we do hereby declare the following to be a full, clear, and exact description of the invention, such as will enable others skilled in the art to which it appertains to make and use the same.

This invention relates to weeders and cultivators and has for an object to provide a wheeled carriage carrying a shaft or rod adapted to be moved below the surface of the ground and with means to rotate the rod.

The further object of the invention is to provide a wheeled carriage having a rod vertically adjustable and adapted at times to be forced below the surface of the soil and with means operated from the wheels for rotating the rod at all positions.

With these and other objects in view the invention comprises certain novel constructions, combinations and arrangements of parts as will be hereinafter fully described and claimed.

Figure 2:
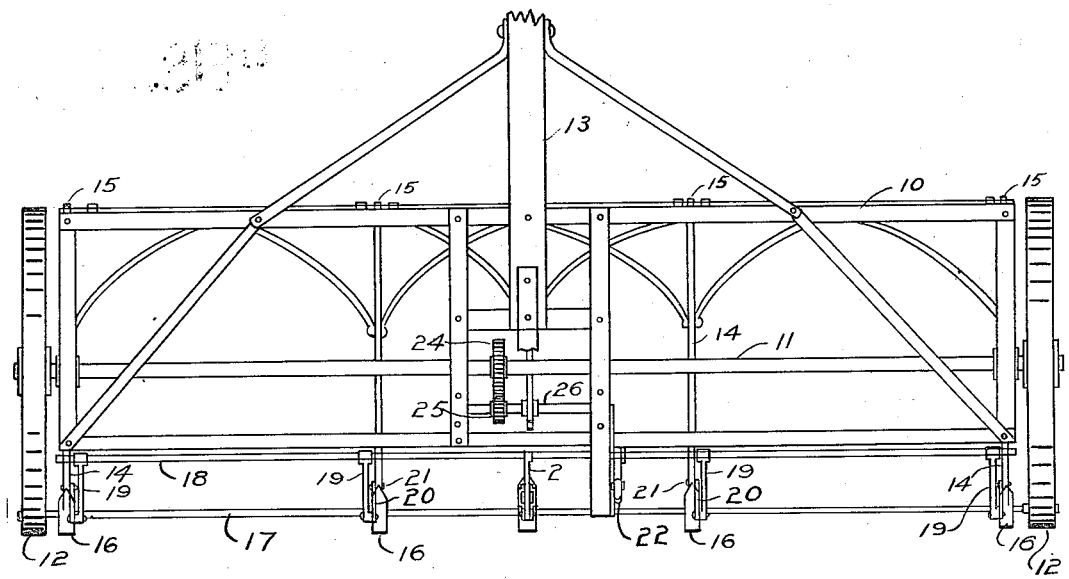
Figure 1:
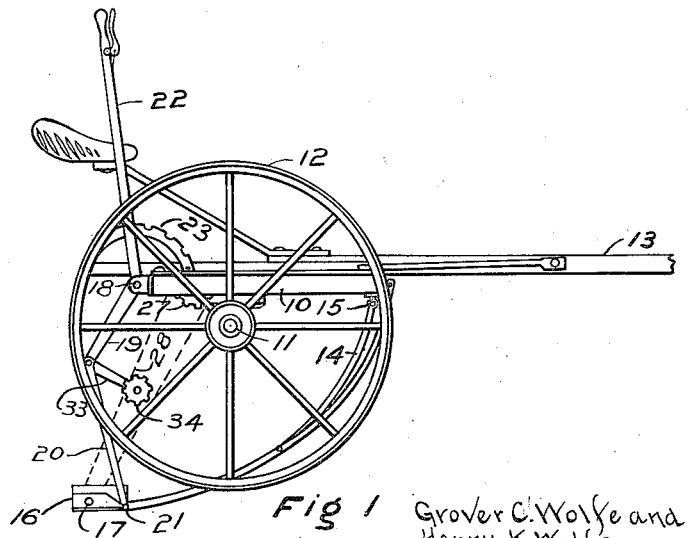
Figure 3:
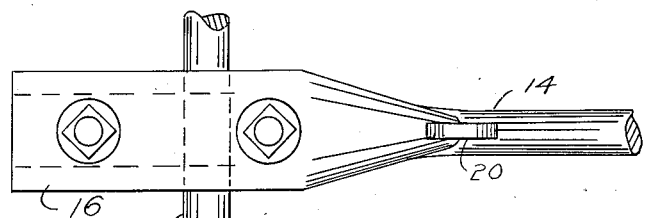
Figure 5:
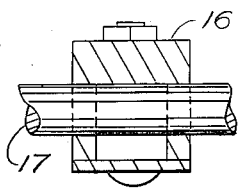
Figure 4:
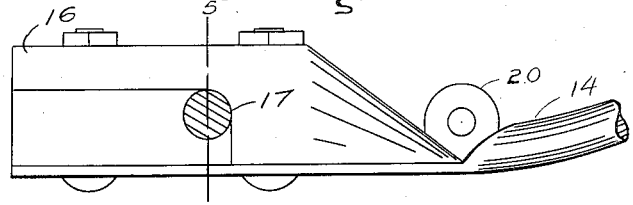
Figure 6:
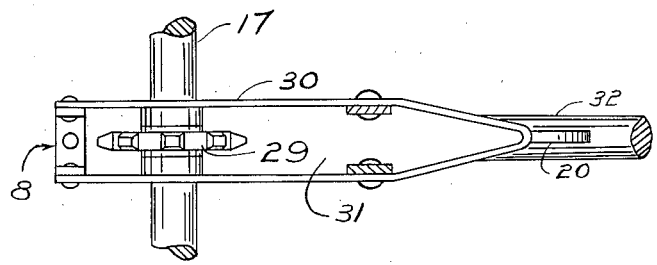
Figures 7, 8:
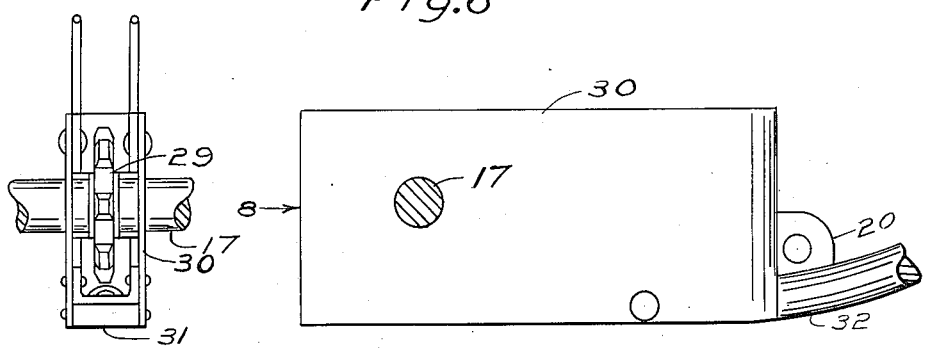

In the drawings—Figure 1 is a view of the improved cultivator and weeder in side elevation. Fig. 2 is a top plan view of the implement. Fig. 3 is a detail top plan view of one of the bearings of the rotating shaft. Fig. 4 is a view in side elevation of one of the bearings as shown in Fig. 3. Fig. 5 is a detail, sectional view of the bearing as taken on line 5—5 of Fig. 4. Fig. 6 is a top plan view of the center bearing providing space for the sprocket. Fig. 7 is a view in end elevation of the center bearing shown in Fig. 6. Fig. 8 is a rear view of the center bearing as indicated by arrow 8 of Figs. 6 and 7.

Like characters of reference designate corresponding parts throughout the several views.

The frame 10 is supported by an axle 11 and wheels 12 and controlled in any usual or ordinary manner as by the tongue or pole 13. To the forward part of the frame a plurality of braces 14 are pivoted as at 15. At their lower and rearward ends the braces 14 are provided with bearing blocks or boxes 16 and therein is journaled a shaft or rod 17. Also journaled upon the frame is a shaft 18 extending longitudinally thereof and provided with arms 19 which are pivotally connected with links 20 which extend down to a pivot bolt 21 carried adjacent the front end of the shoe blocks 16. The shaft 18 is provided with a lever 22 engaging a segment 23 in the usual manner and rigidly connected with the shaft 18 whereby such shaft may be rotated to raise and lower the shoe blocks 16, and the brace rods 14.

Centrally of the frame the shaft 11 carries a spur gear 24 which engages a pinion 25 carried upon a shaft 26 which also carries a sprocket 27. The sprocket 27 carries a chain 28 which passes over a sprocket 29 upon the shaft 17 whereby when the shaft 11 is rotated by an action of the wheels 12 the shaft 17 is also rotated at a much greater rate of speed by reason of the interposition of the gearing mentioned.

The sprocket 29 is located in a housing 30 having a bottom 31 which prevents the entry of dirt into such housing, such housing being carried by a brace rod 32 and pivoted to the shaft at the front of the frame. The housing 30 is also controlled by one of the arms 20 carried by the rod 18 and a right-angularly disposed arm 33 also carries an idler sprocket 34 engaging the sprocket chain 28 whereby when the lever 22 has been manipulated to raise the rod 17 the sprocket chain 28 is tightened to maintain such chain in operative condition.

It will be apparent that with the parts disposed in such relation as shown at Fig. 1 the shaft 17 will be below the surface of the soil and when drawn across the field such rod will engage the roots of weeds and draw such weeds under the surface of the soil. The rotation of the shaft will be such as to wind the weeds off from the rotating shaft so that it will constantly and automatically clear itself, whereby the weeds will be left upon the surface of the soil and the soil at the same time loosened and cultivated.

We claim:

1. In a device of the class described, a frame, an axle for the frame, supporting traction wheels upon the axle, arms pivoted to the frame in front of the axle and extending to the rear thereof, a shaft journaled at the extremities of the arms in parallelism with the axle, means to force the extremities of the arms and shaft below the level of the supporting wheels, and means to rotate the shaft from the axle.

2. The combination of supporting wheels, an axle and frame thereon, of arms pivoted to the frame in front of the axle and extending to the rear thereof, a shaft journaled at the extremities of the arms, another shaft mounted to rotate upon the rear of the frame, levers and links connecting the last mentioned shaft with the extremities of and to force the arms below the level of the supporting wheels, and means to drive the first mentioned shaft from the axle.

3. The combination of a frame, axle and supporting wheels, of arms pivoted to the frame in front of the axle and extending to the rear thereof, a shaft journaled at the rear of the frame, a hand lever for rotating such shaft, lever arms carried by the shaft, links connecting the lever arms to the rear extremities of the first mentioned arms, a rotating member journaled at the extremities of the first mentioned arms, a sprocket chain conveying motion from the axle to the rotating member, and a chain tightener carried by the lever arm and moving with the shaft.

In testimony whereof we affix our signatures in presence of two witnesses.

GROVER C. WOLFE.
HENRY K. WOLFE.

Witnesses:
S. H. WENTWORTH,
H. E. SMITH.